United States Patent [19]
Moriya

[11] 3,813,206
[45] May 28, 1974

[54] CIGARETTE LIGHTER
[75] Inventor: Nobuyoshi Moriya, Urawa, Japan
[73] Assignee: Mansei Kogyo Kabushiki Kaisha, Kawaguchi-shi, Saitoma, Japan
[22] Filed: Aug. 16, 1972
[21] Appl. No.: 280,993

[30] Foreign Application Priority Data
Oct. 5, 1971 Japan................................46-91379
July 25, 1972 Japan................................47-87732

[52] U.S. Cl............................... 431/143, 431/255
[51] Int. Cl............................................ F23q 2/00
[58] Field of Search........... 431/130, 131, 142, 143, 431/150, 254, 255, 276, 277, 344

[56] References Cited
UNITED STATES PATENTS
2,732,697  1/1956  Peterson et al..................... 431/142
3,241,342  3/1966  Wieden et al..................... 431/150 X
3,506,386  4/1970  Goto.................................. 431/255

Primary Examiner—Carroll B. Dority, Jr.
Attorney, Agent, or Firm—Armstrong, Nikaido & Wegner

[57] ABSTRACT

A cigarette lighter, including a casing; an ignition mechanism; a fuel tank having an extension at its lower end; at least one through-bore formed in the extension of the fuel tank; and a fastening plate one end of which penetrates the throughbore. The fastening plate is fixed to a bottom plate of the casing by a screw member which is screwed through the bottom plate and the fastening plate into a female screw member disposed on the fastening plate.

9 Claims, 2 Drawing Figures

PATENTED MAY 28 1974

3,813,206

CIGARETTE LIGHTER

BACKGROUND OF THE INVENTION

In known cigarette lighters, the fuel tank is formed together with the lighter casing as a unitary body or the tank is soldered onto the casing or onto an ignition mechanism (German Patent No. 1,001,845 and U.S. Pat. No. 3,081,611). According to these lighters, the positional relationship between the fuel tank and the casing or ignition mechanism must be accurate to accommodate other component parts within the casing. Therefore, accurate soldering is indispensable in the manufacturing process for these lighters. Another defect of such known cigarette lighters is that the replacement of the fuel tank requires the concurrent replacement of the associated lighter casing or ignition mechanism.

Further, in known cigarette lighters, a resilient member is interposed between the fuel tank and ignition mechanism in order to fix the fuel tank within the casing (British Patent No. 1,066,943). The defect of this type of cigarette lighter is that the fixation of the fuel tank within the lighter casing is liable to come loose especially due to the weakening of the resilient member.

Also, in known cigarette lighters, a base plate, serving as a common bottom wall both for the fuel tank and the lighter casing, is fixed to the lower opening of the fuel tank (U.S. Pat. No. 3,494,710). At first the fuel tank is secured at its sidewall and base plate to an ignition unit by two or three screws. Then the ignition unit is secured to the lighter casing by another screw at the lower sidewall of the casing. The defect of such a lighter is that the assemblage requires several screws and rather complicated steps. Moreover, the base plate is fixed through the ignition unit to one of the side walls of the lighter casing, enhancing the loosening between the base plate and the lighter casing such that the screw in the sidewall of the casing will spoil the external appearance of the lighter.

SUMMARY OF THE INVENTION

The present invention is intended to get rid of the above-mentioned defects in known cigarette lighters and as well to provide an improved fixing means for the fuel tank in a cigarette lighter which is easy to assemble and disassemble.

According to the invention, there is provided a cigarette lighter comprising a casing; an ignition mechanism; a fuel tank having an extension at its lower end; at least one through-bore formed in said extension; and a fastening plate one end of which penetrates said through-bore, whereby said fastening plate is fixed to a bottom plate of said casing by a screw member which is screwed through said bottom plate and said fastening plate into a female screw member disposed on said fastening plate.

The bottom plate may be formed together with the casing as one body. Alternatively, the bottom plate may be formed separately from the casing, wherein plural through-bores are formed in the extension of the fuel tank and the bottom plate is provided with a protrusion which is engaged with a depression formed on an inner surface of the casing so that the fuel tank may be firmly fixed in place. In this case the other end of the fastening plate is engaged with other depression formed on the inner surface of the casing.

In order to reduce an impact noise caused by a piezoelectric ignition unit, when the latter is used as an ignition mechanism of the cigarette lighter, it is also advantageous to provide a resilient member on the fastening plate as a damper. Further, the fastening plate *per se* may be made of synthetic resin to produce the damping effect.

BRIEF DESCRIPTION OF THE DRAWINGS

The present invention will now be described hereinafter in greater detail in relation to preferred embodiments, given by way of example, taken in conjunction with the accompanying drawings in which.

DETAILED DESCRIPTION

Figure 1:
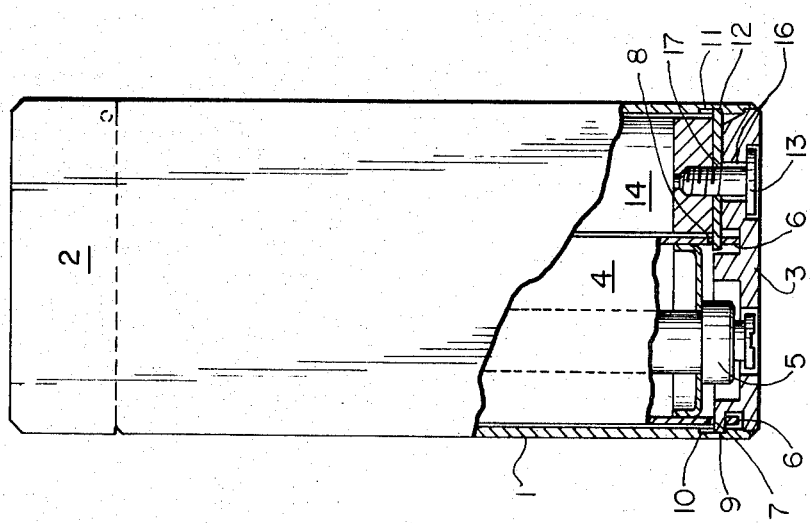
FIG. 1 is a longitudinal broken view of a first embodiment of the invention.

Referring to FIG. 1, casing 1 is provided at the lower open end with bottom plate 3 and at the upper open end with cap 2. Arranged within casing 1 is fuel tank 4, which includes refill valve 5 and a sidewall having at the lower end thereof extension 6. Extension 6 of fuel tank 4 is formed with through-bores 7 and 8, one of which (in this case through-bore 7) is penetrated by protrusion 9 disposed at one end of bottom plate 3. Protrusion 9 further extends to the inner surface of the sidewall of casing 1 to engage depression 10 formed thereon. The other of the through-bores (bore 8) is penetrated by one end of fastening plate 12. The other end of plate 12 is engaged with depression 11 formed on the inner surface of the other sidewall of casing 1. Depressions 10 and 11 may be optionally formed as through-bores. Bottom plate 3 and fastening plate 12 abut and are secured by screw 13 via bores 16 and 17 to the base portion of an ignition mechanism 14 which is, for example, an electrical ignition unit. Thus, bottom plate 3 can be fixed to the casing 1 with extension 6 of the fuel tank 4 abutting against bottom plate 3. Therefore, fuel tank 4 is fixed within casing 1 by means of the engagements between through-bores 7 and 8 and, respectively, fastening plate 12 and protrusion 9 of bottom plate 3.

Figure 2:
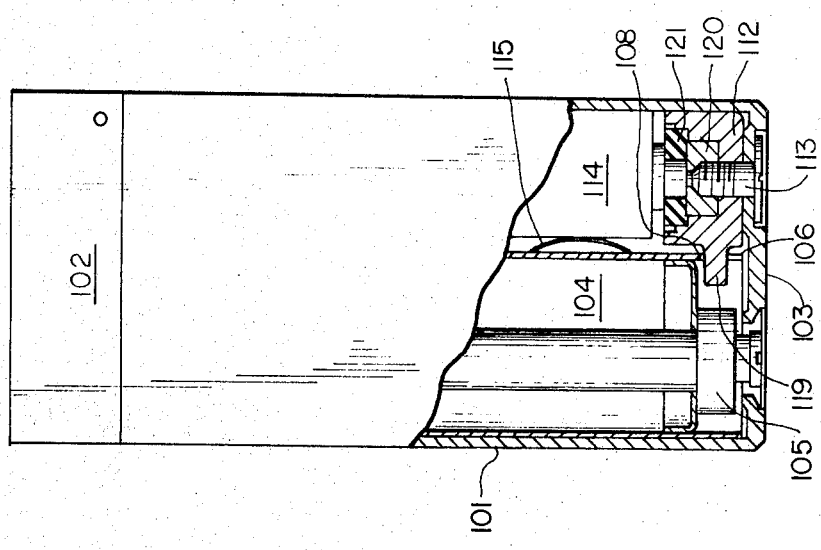
FIG. 2 is another broken view of a second embodiment of the invention.

In FIG. 2 showing a second embodiment of the invention, casing 101 is provided at the upper open end with cap 102. The lower end of casing 101 is formed as one body with bottom plate 103. Arranged within casing 101 is a fuel tank 104, which includes refill valve 105 and a sidewall having extension 106 at the lower end thereof. Extension 106 is formed with through-bore 108 which receives protrusion 119 provided on one end of fastening plate 112. Fastening plate 112 has a cup-like shape for receiving female screw member 120 and resilient member 121 such as rubber on which is arranged ignition mechanism 114, e.g., a piezoelectric ignition unit. Fastening plate 112 is secured to bottom plate 103 by screw 113 which is threaded into female screw member 120 through bottom plate 103 and fastening plate 112 so that extension 106 of the fuel tank 104 abuts against bottom plate 103. Thus, fuel tank 104 is fixed within casing 101 by means of the engagement between through-bore 108 and protrusion 119. Resilient member 121, preferably ring-shaped, serves as a damper to reduce impact noise generated by the piezoelectric ignition unit. As to the fastening plate 112, the same is preferably made of synthetic resin to add to said damping effect. Between fuel tank 104 and ignition mechanism 114 can be interposed leaf spring 115 to press both fuel tank 104 and ignition mechanism 114 against the inner surface of casing 101 to effect a stable fixation of fuel tank 104, thereby holding ignition mechanism 114 within casing 101.

While several embodiments of the invention have been shown and described, other variations will be readily apparent to those skilled in the art. Therefore, the invention is not limited to these embodiments but is intended to cover all such variations as may be within the scope of the invention defined by the following claims:

I claim:

1. A cigarette lighter comprising a casing having a bottom plate with an opening therein; an ignition mechanism disposed within said casing; a fuel tank arranged near said ignition mechanism and having an extension extending therefrom and located adjacent said bottom plate, said extension including engagement means; a member arranged below said ignition mechanism and adjacent said bottom plate wherein said member is engaged by said engagement means to pull said fuel tank toward said bottom plate whereby said fuel tank is fixedly secured within said casing when set in position; securing means extending through said opening of said bottom plate to secure said member within said casing; and said securing means provided with an flange portion adapted to engage the outer surface of said bottom plate so as to limit the movement of said securing means.

2. a cigarette lighter according to claim 1, wherein said engagement means is a cut-out portion with which said member is engaged.

3. A cigarette lighter according to claim 1, wherein said engagement means is a through-bore formed in said extension and said member has a portion to engage said through-bore whereby said tank is firmly secured within said casing.

4. A cigarette lighter according to claim 3, wherein said securing means is provided with a male screw portion and said lighter further comprises a female screw means arranged adjacent said member to engage said male screw portion of said securing means to secure said fuel tank within said casing through said member.

5. A cigarette lighter according to claim 3, wherein said casing has an open bottom end and a depression formed on the inner surface thereof with a bottom plate adapted to be disposed in said casing to cover said open bottom end, said bottom plate being provided with a fitting means thereon adapted to be in fitting engagement with said depression of the inner surface of said casing; and said extension of said fuel tank having an additional through-bore formed therein in alignment with said depression of said casing so as to engage with said fitting means of said bottom plate; whereby said fuel tank is further secured within said casing through the engagement between said fitting means and said depression by said bottom plate.

6. A cigarette lighter according to claim 5, in which said member engaged with one of said through-bores is further engaged with a depression formed on the inner surface of said casing.

7. A cigarette lighter according to claim 3, comprising said securing means having a threaded shank portion extending through said opening; and said member being made of synthetic resin and provided with a female screw therein whereby said shank portion engages said female screw.

8. A cigarette lighter according to claim 7, wherein said female screw is formed on a nut means and wherein said nut means is embedded within said member.

9. A cigarette lighter according to claim 8, comprising a damper arranged between said ignition mechanism and said member; and said member formed with a depression so dimensioned as to correspond with the configuration of said damper and wherein at least a portion of said damper is positioned within said depression.

* * * * *